US005436606A

United States Patent [19]

Cottevieille et al.

[11] Patent Number: 5,436,606

[45] Date of Patent: Jul. 25, 1995

[54] FEED CONNECTION FOR A SUPERCONDUCTIVE COIL

[75] Inventors: Christian Cottevieille, Montreuil; Gérard Bottini, Lardy, both of France

[73] Assignee: GEC Alsthom Electromecanique SA, Paris, France

[21] Appl. No.: 191,166

[22] Filed: Feb. 3, 1994

[30] Foreign Application Priority Data

Feb. 4, 1993 [FR] France ................................ 93 01213

[51] Int. Cl.⁶ .......................... H01F 1/00; H02H 7/00; H01H 47/00

[52] U.S. Cl. ............................. 335/216; 336/DIG. 1; 361/19; 361/141; 505/879

[58] Field of Search .................. 335/216; 361/19, 141; 505/705, 879; 336/DIG. 1; 62/51.1

[56] References Cited

U.S. PATENT DOCUMENTS

| | | | |
|---|---|---|---|
| 4,438,367 | 3/1984 | Kerns . | |
| 4,509,030 | 4/1985 | Vermilyea . | |
| 5,065,582 | 11/1991 | Seifert | 62/45.1 |
| 5,168,125 | 12/1992 | Verhaege | 174/125.1 |

FOREIGN PATENT DOCUMENTS

| | | | |
|---|---|---|---|
| 2637728 | 4/1990 | France . | |
| 2678420 | 12/1992 | France . | |
| 56-70614 | 6/1981 | Japan | 335/216 |
| 1-45106 | 2/1989 | Japan | 335/216 |
| 1-286729 | 11/1989 | Japan | 335/216 |
| 2-280304 | 11/1990 | Japan | 335/216 |
| 3-123005 | 5/1991 | Japan | 335/216 |
| 4-343208 | 11/1992 | Japan | 335/216 |

*Primary Examiner*—Leo P. Picard
*Assistant Examiner*—Stephen T. Ryan
*Attorney, Agent, or Firm*—Sughrue, Mion, Zinn, Macpeak & Seas

[57] ABSTRACT

The present invention provides a connection for feeding electricity to a transposed superconductive coil, the coil being placed in a cryostat and comprising a plurality of identical superconductive conductors, the free ends of which are distributed uniformly with cylindrical symmetry, the connection being constituted by two current leads each composed of a plurality of identical lead conductors each comprising a first end and a second end, the connection being characterized in that the number of the conductors is identical in each lead and equal to the number of the superconductive conductors in the coil, in that the conductors of the leads are disposed regularly and in parallel with the cylindrical symmetry about the axis of said coil, in that the leads are disposed coaxially and in that the first end of each lead conductor is connected to a respective superconductive conductor.

17 Claims, 6 Drawing Sheets

FEED CONNECTION FOR A SUPERCONDUCTIVE COIL

The present invention relates to a connection intended to feed electricity to a high voltage superconductive coil at a high nominal current of several hundred amps. For example, the coil may be a 1200 amp current limiter at 63 kV; it must be capable of withstanding 2.2 times its nominal voltage, i.e. 139 kV (recommendation CEI71). The connection allows the superconductive coil, which is disposed in a cryostat within a cryogenic fluid at very low temperature, to be electrically connected to a conductor situated externally and at ambient temperature (300 K.).

When the nominal current of the coil is high, a plurality of superconductive conductors are used. The problem then arises of achieving an equal distribution of current in the different superconductive conductors. One attractive solution is to use a transposed superconductive coil in which each conductor is located in an eletromagnetic environment identical to that of its neighbours. In such a coil, the conductors are distributed with perfect cylindrical symmetry. This allows each conductor to carry its critical current, which is identical for every conductor, thus allowing the currents in the coil to be equalized.

Conventionally, the electrical feed is provided by two spaced-apart current leads provided with polycarbonate insulating sheaths, which are ill-suited to feeding a coil made up of a plurality of superconductive conductors. Moreover, that type of feed carries penalties as to dielectric considerations. That technology, which is described in French Patent No. 2637728, does not permit the voltage to exceed 100 kV, even temporarily. In addition, it is difficult to find solid electrical insulators which can be used at such low temperatures and having dimensions that enable them continuously sustain the voltage level.

The trend towards high currents and high voltages in superconductive coils, particularly in current limiters, necessitates the production of feed connections which satisfy such requirements.

An object of the present invention is to procure a connection allowing a high current to be supplied in a balanced manner to high voltage superconductive coils.

The present invention provides a connection for feeding electricity to a transposed superconductive coil. The coil is placed in a cryostat and comprises a plurality of identical superconductive conductors, the free ends of which are distributed uniformly with cylindrical symmetry. The connection is constituted by two current leads each composed of a plurality of identical lead conductors each comprising a first end and a second end. The connection is characterized in that the number of conductors is identical in each lead and equal to the number of superconductive conductors in the coil; it is also characterized in that the conductors of the leads are disposed regularly and in parallel with cylindrical symmetry about the axis of the coil; it is also characterized in that the leads are disposed coaxially; and finally, it is characterized in that a first end of each lead conductor is connected to a respective superconductive conductor.

Thus, the connection of the invention as defined above does not break the cylindrical symmetry of the coil and current balancing is guaranteed. One advantage of the present invention is to allow a balanced feed to the coil, so that each superconductive conductor can carry its critical current and can be used under optimum conditions. The total cross-section of the set of conductors in the input leads and in the output leads is fixed as a function of the current to be carried.

The connection between a lead conductor and a superconductive conductor of the coil is made by placing their ends side by side over a length of about 10 cm. The lead conductors are then connected to the superconductive conductors of the coil by soldering or by magnetoforming.

Preferably, the second end of each current lead conductor is secured to a cylindrical conductive part. The shape and dimensions of this part are chosen according to the voltage level and current carried. Preferably, the cylindrical conductive part is made of copper.

In a first embodiment, each conductor of the current leads is individually placed within an electrically insulating tube. These insulating tubes may be of epoxyglass or similar material. The tubes containing each individual conductor are disposed in cylindrical symmetry. Circulation of cryogenic fluid vapor ensures that the conductors of the current leads are cooled inside the insulating tubes. The lower portions of these tubes are filled with the cryogenic liquid which is surmounted by its vapor. These tubes ensure a loss of head allowing optimum cooling of the conductors to be obtained.

In a second embodiment, the conductors of each lead are placed within the double walls of two double-walled electrically insulating tubes, the two tubes being disposed coaxially.

In this case, the cryogenic fluid vapor ensuring cooling of the conductors circulates inside the double wall of each insulating tube.

An advantage of the present invention is that the overall structure of the installation avoids the use of polycarbonate tubes, the size of which carries too heavy a penalty.

In a variant, the conductors of the current leads are of the assembled type comprising a plurality of strands, constituted by copper filaments in a cupro-nickel matrix to reduce induced current losses, these losses being optimized at 1.2 W/kA at the nominal current.

In another variant, the conductors of the current leads are of the hybrid type comprising, in their low temperature portion, a superconductive element of high critical temperature, such as that described in French Patent No. 9107967.

The connection of the invention is intended to be applied to an apparatus comprising a superconductive coil placed in a cryostat. The cryostat comprises an external wall and a metal internal wall maintained at the high voltage, the two walls being separated by a vacuum.

In a first embodiment, the external wall of the cryostat is constituted by an electrically insulating material, such as a composite. Preferably, the external wall of the cryostat bears ribs of insulating material, such as an elastomer which may or may not be filled with glass or ceramic, the ribs being intended to increase the creepage distance.

In a second embodiment, the external wall of the cryostat is made of metal and is earthed. In this case, its walls are also insulated from each other by an insulating part comprising anti-coronas, i.e. toroidal members with conductive surfaces intended to avoid the "corona" effect. This insulating material may for example be a ceramic, a composite or some similar material.

In a variant, the part of insulating material comprises ribs of an insulating material identical to or different from that of the part.

In an improvement, a solid electrical insulator is included between the conductors in the hot zone of the cryostat. This insulator may be of polycarbonate, polyethylene, epoxy resin or some other similar material, or the insulator may even be constituted by an enclosure containing an insulating liquid of the transformer oil or silicone oil type, or a gaseous insulator such as nitrogen, or sulphur hexaflouride or some other gas having greater dielectric strength than helium. In which case, the chamber may advantageously be thermally insulated from the cryogenic fluid vapor by a suitable thermal insulator such as a vacuum or expanded polystyrene.

The invention will be better understood and other advantages and features will be apparent from the following description, given purely by way of non-limiting example, and accompanied by the drawings in which.

Figure 1:
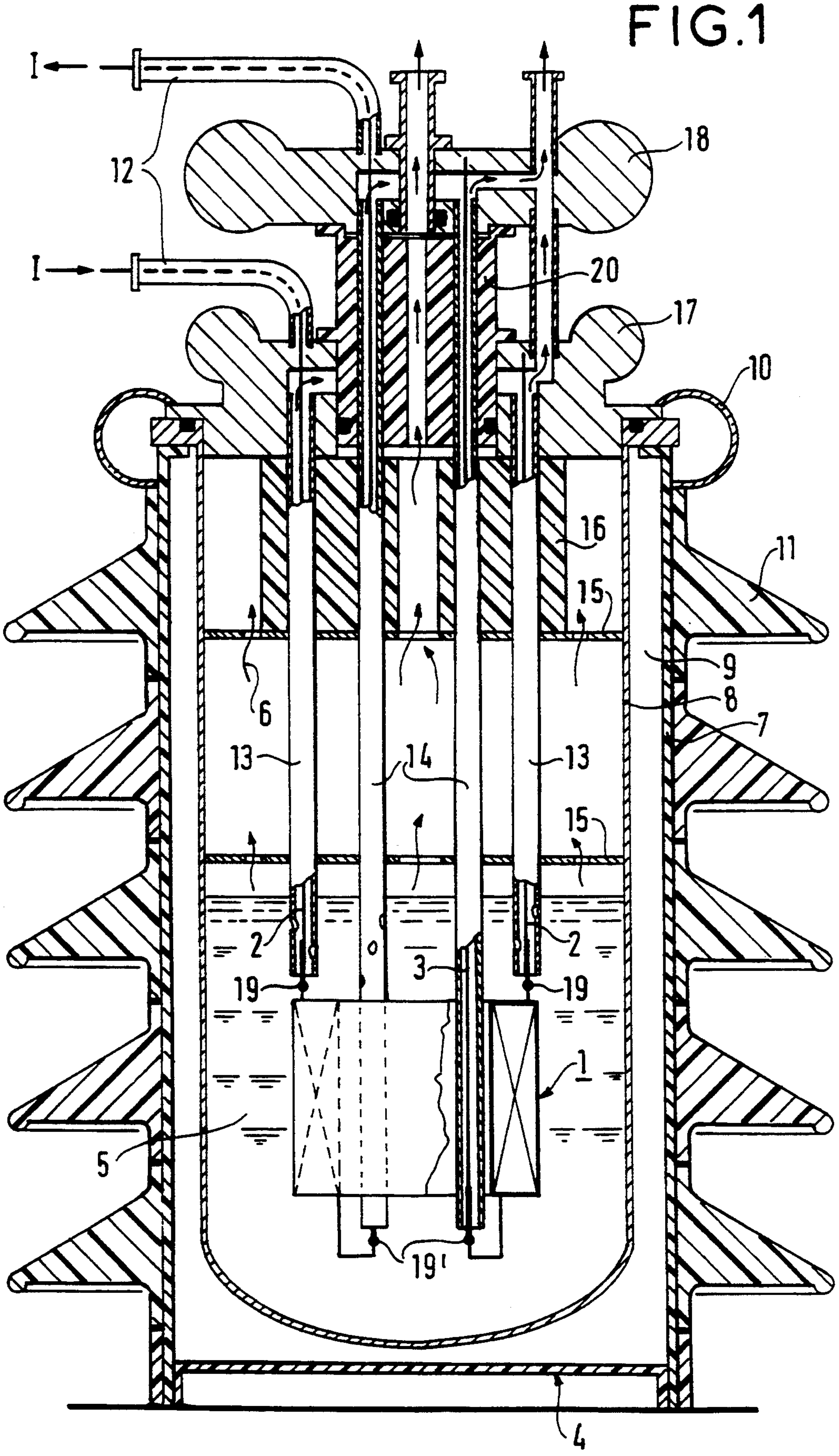
FIG. 1 represents a connection of the invention between a superconductive coil, placed in a cryostat, and an electrical feeder circuit situated outside the cryostat, in the case where each of the conductors is placed inside a respective electrically insulating tube.
Figure 5:
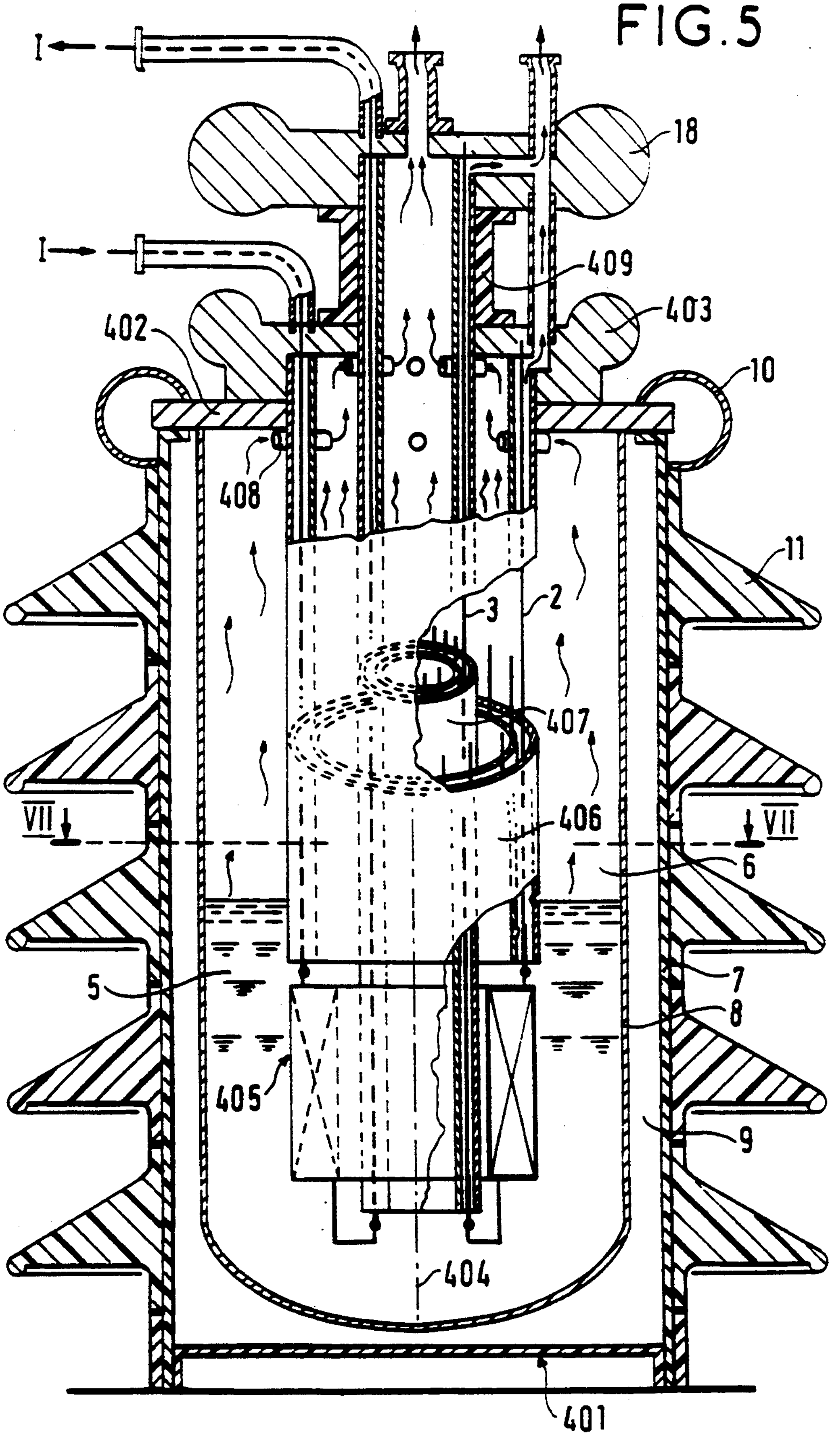
Figure 6:
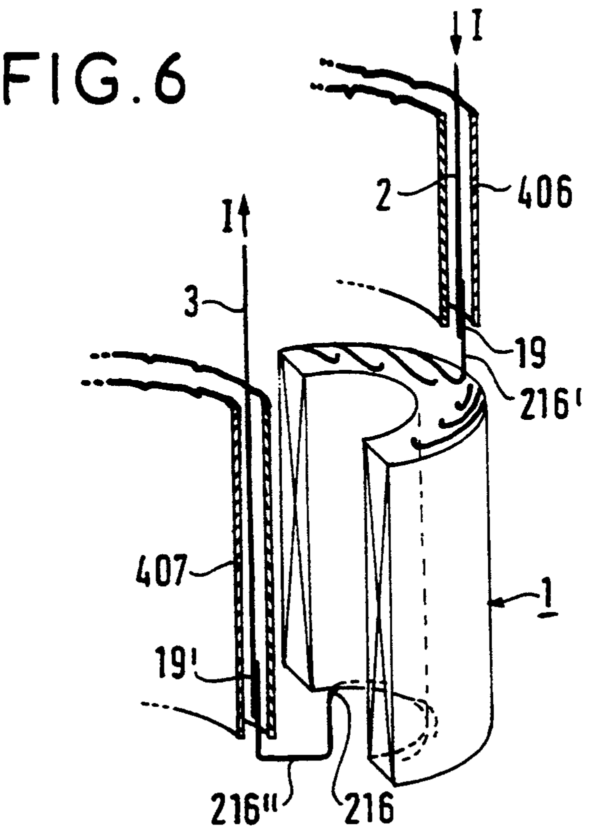
Figure 7:
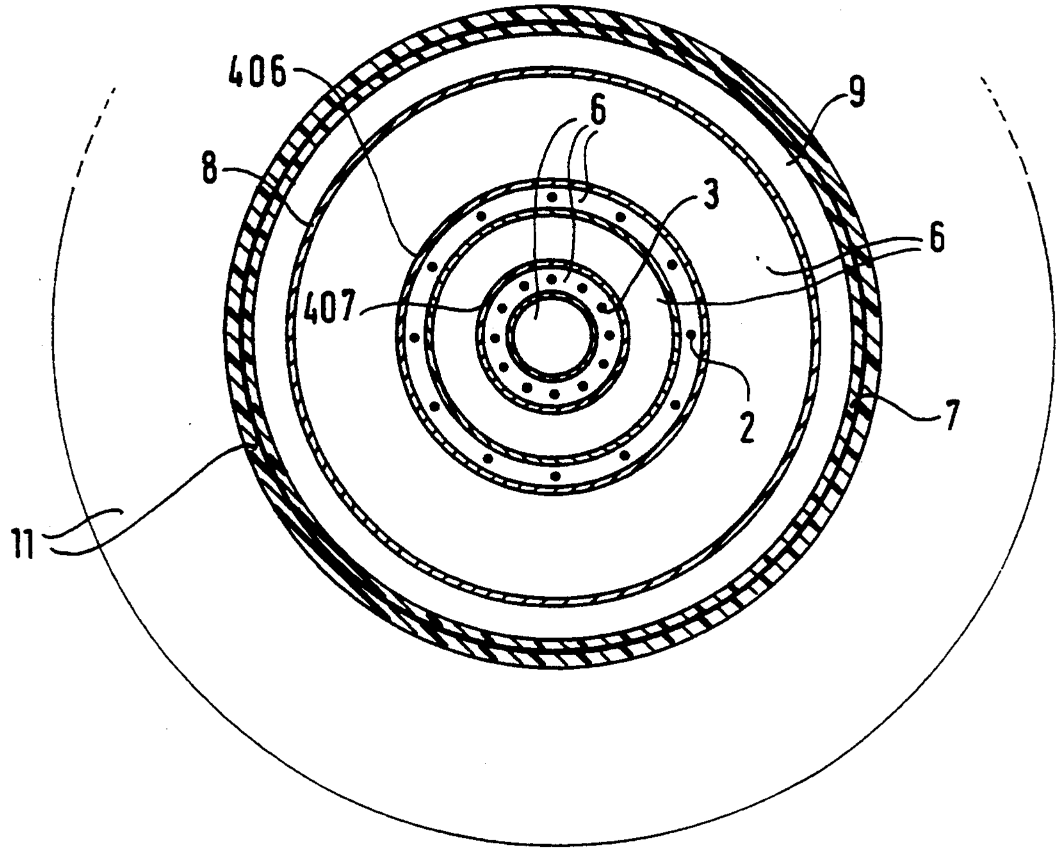
Figure 8:
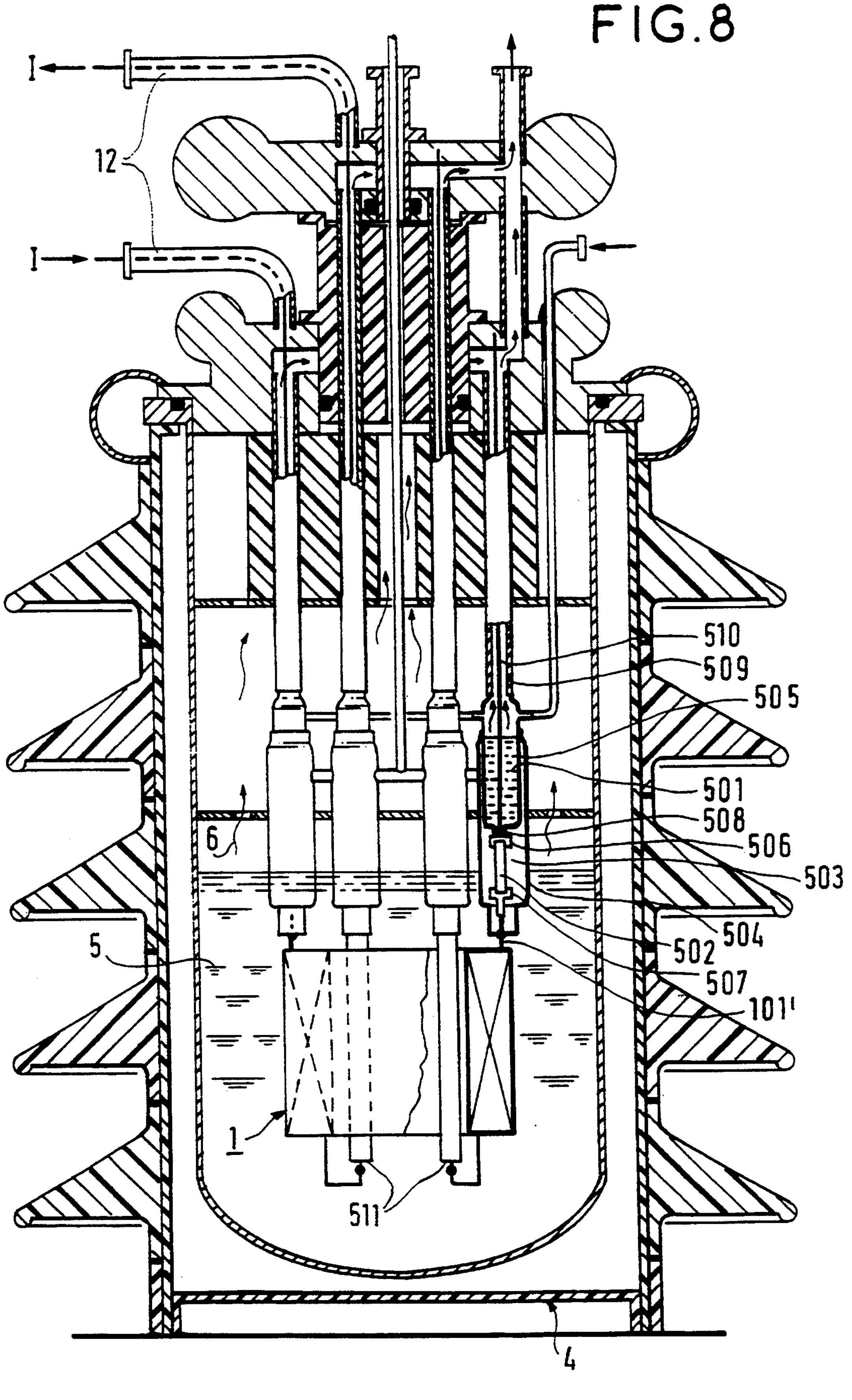

FIG, 5, similar to FIG. 1, shows a variant of the connection of the invention in which the conductors are located within the double walls of two double-walled electrically insulating tubes, FIG. 6 is a detail of the superconductive conductor/current lead conductor connection of FIG. 5, FIG. 7 is a section through the connection on line VII—VII of FIG. 5, and FIG. 8, similar to FIG. 1, shows a connection of the invention between a superconductive element placed in a cryostat and an electrical feeder circuit situated outside the cryostat, in the case where each conductor is of the hybrid type described in French Patent No. 9107967.

FIG. 1 shows a superconductive coil 1 and its two current leads placed in a cryostat 4 within a cryogenic fluid 5, which is liquid helium (4.2 K.), surmounted by its vapor 6. Each current lead is composed of four conductors, with two of the conductors in each lead being visible while the other two are hidden, the current input conductors are referenced 2 and the current output conductors are referenced 3.

Figure 2:
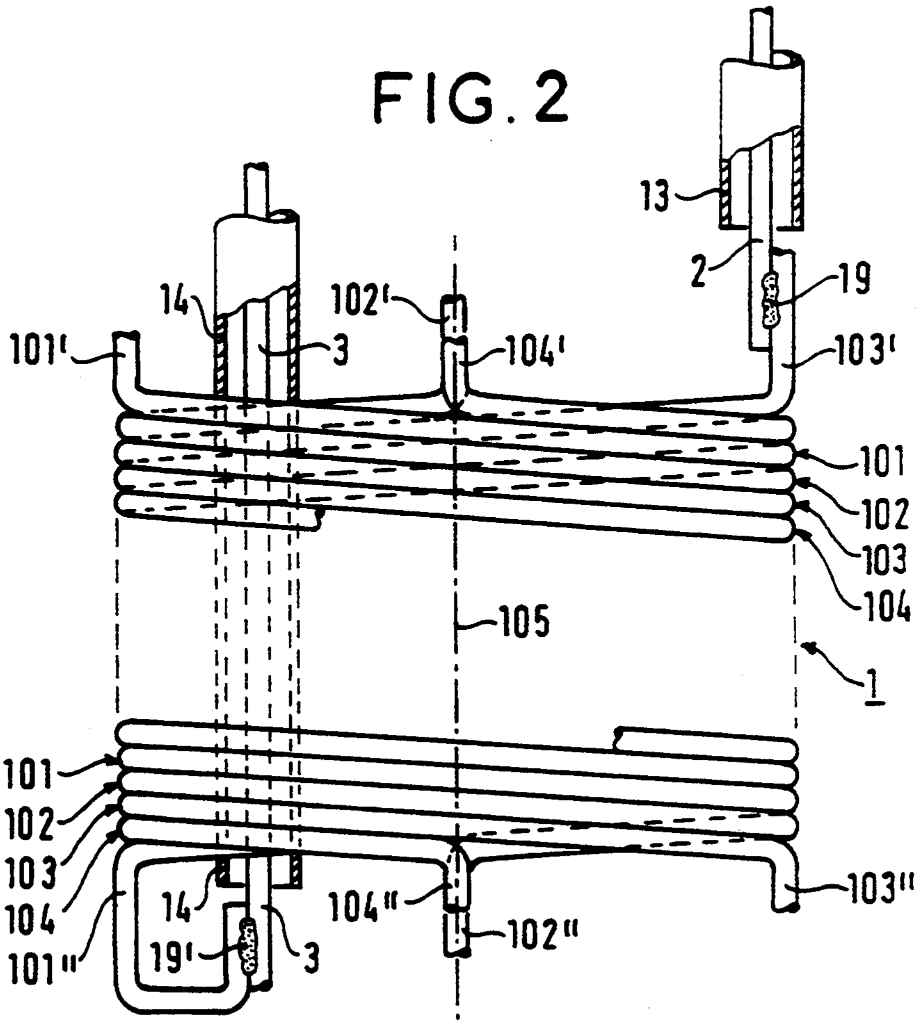
FIG. 2 is an enlarged view of the superconductive coil of FIG. 1.

The superconductive coil 1 is shown on a larger scale in FIG. 2. Four superconductive conductors 101 to 104 are wound side-by-side to constitute a superconductive coil. The ends of the superconductive conductors are disposed on either side of the coil with cylindrical symmetry about the winding axis 105 of the coil. The first ends 101' to 104' of the superconductive conductors are connected to the conductors 2 of the input current lead, and the second ends 101'' to 104'' of the superconductive conductors are connected to the conductors 3 of the output current lead.

An electrical feeder circuit 12 can be seen in FIG. 1, situated outside (300 K.) the cryostat 4, and joined to the coil 1 by the two input and output current leads. The free ends of the input conductors 2 and the free ends of the output conductors 3 are regularly distributed on a first circle and a second circle, respectively, with the circles being centered on the winding axis 105 of the coil.

The conductors 2 of the input current lead are secured, at a first end, to a conductive part 17, preferably made of copper; similarly, the conductors 3 of the output current lead are secured to a conductive part 18, also preferably made of copper. These two parts 17 and 18 are mechanically joined to each other, and electrically insulated from each other, by a suitably sized part 20 of insulating material, such as a composite or some other similar material.

Figure 3:
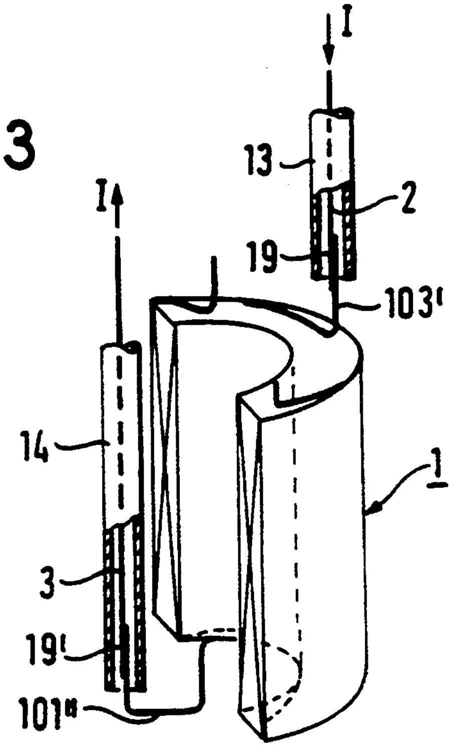
FIG. 3 is a detail of the connection between the superconductive conductor and the current lead conductor of FIG. 1, FIG. 4, similar to FIG. 1, shows a variant in which the external enclosure of the cryostat is made of metal.

As shown in more detail in FIG. 3, the conductors 2 of the input current lead are connected, at a second end, to the ends 101' to 104' of the superconductive conductors of coil 1. This bond 19 is produced by placing the end of one conductor 2 and the end 103' of a superconductive conductor side-by-side over a length of about 10 cm and then by soldering them together, or by magneto-forming. Similarly, the conductors 3 of the output current lead are connected, at a second end, to the ends 101'' to 104'' of the superconductive conductors of coil 1. These bonds 19' are produced in a similar manner as described above for the bond between the end of a conductor 3 and the end 101'' of a superconductive conductor of the coil 1.

In the case shown in FIG. 1, the conductors 2 and 3 of the input and output current leads are individually placed in electrically insulating tubes 13 and 14 respectively, which tubes are perforated over their lower portions and which are immersed in the cryogenic liquid 5. The vapor 6 of the cryogenic liquid 5 circulate inside these tubes and cool the conductors 2 and 3. Passages are formed in the copper parts 17 and 18 and in the insulating part 20, to allow the vapor 6 to escape.

When the coil undergoes transition, electrical insulation between the conductors 2 and 3 of the input and output current leads is ensured in the hot zone by gaseous helium. Thermal screens 15 ensure heat exchange between the cryogenic fluid 5 and the hot zone (above the lower thermal screen 15) of the cryostat 4 is uniform. Moreover, the electrical insulation between the conductors 2 and 3 of the input and output current leads is improved by the presence of a solid electrical insulator 16 which may be constituted by a solid material or by an enclosure containing an insulating fluid (liquid or gas).

The cryostat 4 is constituted by an external wall 7 of an insulating material, such as a composite or some other similar material, and a metal internal wall 8 at the high voltage. The two walls are separated by a vacuum 9. The top part of the cryostat is provided with conductive surfaces 10 of toroidal outline to avoid the "corona" effect, and which are designated hereinafter as "anti-coronas". Ribs 11 of insulating material, such as an elastomer, may cover part or all of the height of the cryostat, and are intended to lengthen the creepage distance.

Figure 4:
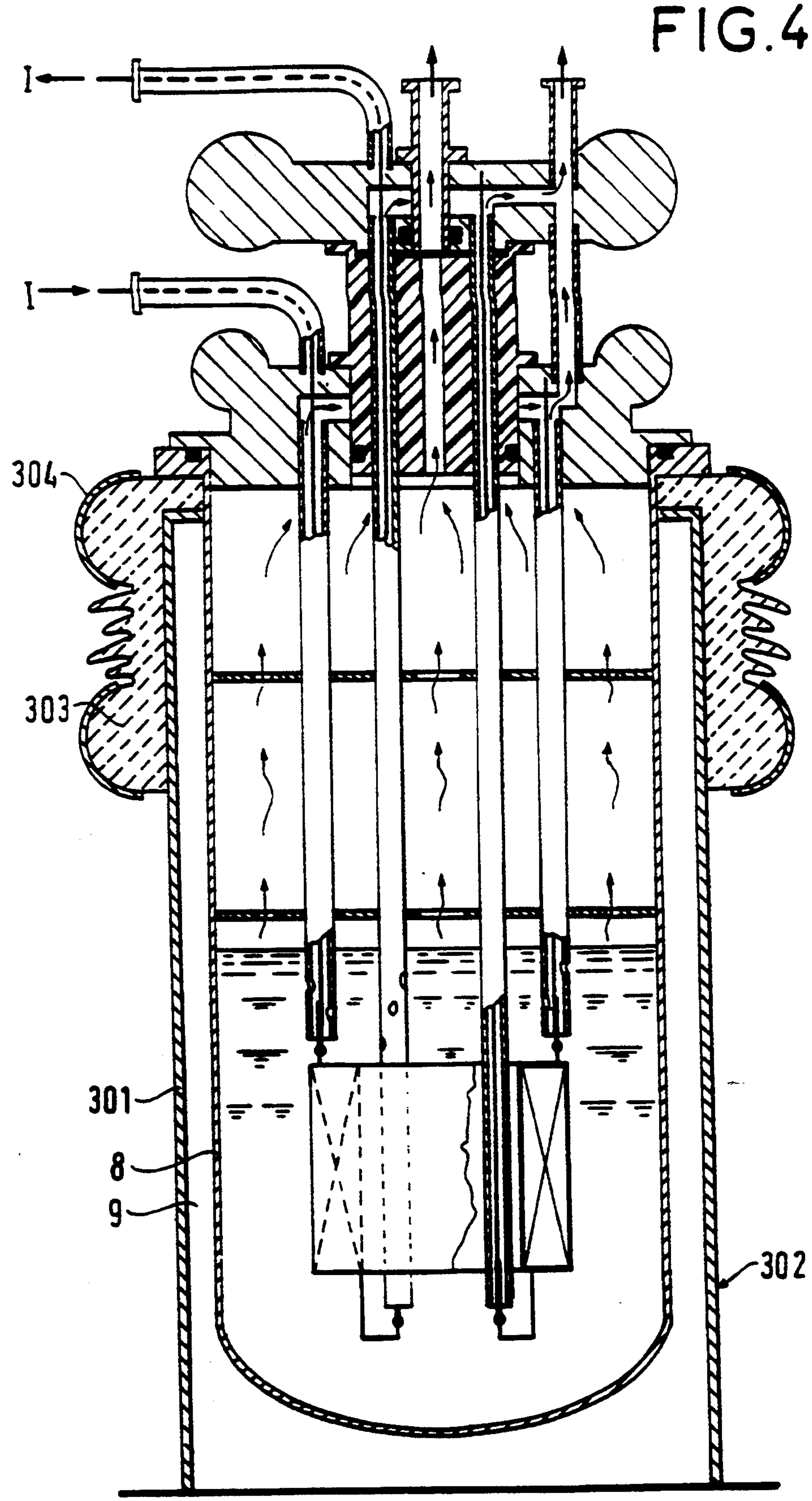

A variant on FIG. 1 is shown in FIG. 4, in which the external wall 301 of the cryostat is made of metal and is earthed. In this case, the external wall 301 is electrically insulated from the metal internal wall 8 which is at the high voltage both by the vacuum 9 and by a member 303 of insulating material such as a ceramic or a composite. Member 303 should be provided with anti-coronas 304 suitable for the voltage level. The member 303 may also be provided with ribs of an insulating material, such as an elastomer, intended to lengthen the creepage distance, these ribs being similar in shape to those previously described and shown in FIG. 1.

FIG. 5 shows a variant of the connection of the invention, in which the external wall 7 of the cryostat 401 is insulating and provided with ribs 11. A metal flange 402 which carries anti-coronas 10 electrically connects the internal wall 8 of the cryostat 401 to a cylindrical copper member 403. Each current lead comprises twelve conductors. Both the input lead current conductors 2 and the output lead current conductors 3 are disposed uniformly and in parallel with the generator lines of respective input and output cylinders coaxial with the axis 404 of the coil 405. The conductors 2 and 3 are secured at a first end to conductive members 403 and 18 respectively, these preferably being of copper. Members 403 and 18 are electrically insulated by a correctly-sized member 409 of an insulating material, such as a composite or a similar material.

The second end of each of the conductors 2 and 3 is bonded to one of the twelve superconductive conductors of the coil 405 using the technique described previously. The detail of these bonds 19 and 19' is shown in FIG. 6, in which the conductors 2 and 3 are shown bonded to the ends 216' and 216" of the superconductive conductor 216 of the coil 405.

The conductors 2 of the input current lead are placed within the double wall of an electrically insulating tube 406, at the lower portion of which is the cryogenic fluid 5 surmounted by its vapor 6. The conductors 3 of the output current lead are similarly disposed within the double wall of an electrically insulating tube 407. The two tubes 406 and 407 are disposed coaxially. The walls of each of the tubes are perforated at their lower portions to allow the cryogenic fluid to enter inside the double wall. Cooling of the conductors 2 and 3 is ensured by the vapor 6 of the cryogenic fluid which flow along the conductors. The vapors 6 of the cryogenic fluid also circulates outside the tubes and in the gap between them, the vapor crossing through the double wall of each tube via passages 408. The vapor 6 escapes via passages provided in the copper members 403 and 18 and in the insulating member 409.

FIG. 7 shows a cross-section through the cryostat 401 containing tubes 406 and 407. The external insulating wall 7 and the internal wall 8 of the cryostat can be seen, separated by a vacuum 9. The double walls of the tubes 406 and 407 surround the conductors 2 and 3 respectively. The vapor 6 of the cryogenic fluid is present inside the double walls of the tubes 406 and 407, and also around and between these two tubes.

Finally, FIG. 8 shows a connection of the invention between a superconductive coil 1 placed in a cryostat 4 (4.2 K.) and an electrical feed circuit 12 situated outside (300 K.), in the case where the conductors 510 and 511 of each of the two current leads are of the hybrid type described in French Patent No. 9107967. Each metal conductor 510 or 511 is immersed in a bath of liquid nitrogen 501 surmounted by its vapor. The liquid is connected to a superconductive element 502 of high critical temperature, such as the 2212 phase of an alloy of bismuth, strontium, calcium and copper oxide, which provides the Junction between 4.2 K. and the intermediate temperature 77 K.. This element 502 is itself connected to the end 101' of that one of the superconductive conductors 101 to 104 of the coil 1 which lies within the bath of liquid helium 5 at 4.2 K. An isolating vacuum 503 surrounds the bath of nitrogen 501 and the superconductor 502 is separated from the helium vapor 6 by a metal wall 504 made of metal of low electrical and thermal conductivity, such as 304L stainless steel. The bath of liquid nitrogen 501 is contained in a metal receptacle 505 which is of a similar material to the metal wall 504 and which is extended at its upper portion by an electrically insulating tube 509 of epoxy glass or similar material. Contact between the two ends of the superconductive element 502 and the terminals 506 and 507 is made according to the method described by Grivon et al in "YBaCuO current lead for liquid helium temperature applications" 1990 Applied Superconductivity Conference. The upper terminal 506 is thermally insulated from the reservoir of liquid nitrogen by a ceramic insulator 508. This technology allows the thermal losses to be reduced by a factor of between three and five depending on the nature of the metal conductors. Moreover, electrical insulation between the conductors 510 and 511, when the coil undergoes transition, is ensured in the hot zone by the nitrogen vapor which, at that temperature has a dielectric strength ten times greater than that of helium; this is advantageous in view of the trend towards higher voltages.

The invention is of course not limited to the embodiments described and shown, and many variants are possible for the person skilled in the art, without departing from the spirit of the invention. In particular, any means can be replaced by an equivalent means whilst remaining within the scope of the invention.

We claim:

1. A connection for feeding electricity to a transposed superconductive coil, the superconductive coil being placed in a cryostat and having a plurality of superconductive conductors, each superconductive conductor having a first free end and a second free end, the superconductive conductors providing a coil winding around a winding axis, the first and second free ends being regularly distributed on a first circle and a second circle, respectively, with the first and second circles being centered on the winding axis;

the connection comprising two current leads, each current lead providing a plurality of conductors parallel with respect to each other, having two ends, the number of said conductors of each lead being equal to the number of the superconductive conductors of the coil;

one end of each conductor of one of said leads being connected to one first free end of one of the superconductive conductors, said conductor of one of said leads extending along a generating line of an imaginary cylinder centered on the winding axis;

one end of each conductor of the other lead being connected to one second free end of one of the superconductive conductors, said conductor of the other lead extending along a generating line of an imaginary cylinder centered on the winding axis.

2. A connection according to claim 1, wherein said conductors of each current lead are connected to said superconductive conductors of said coil by one of soldering and magneto-forming.

3. A connection according claim 1, wherein the other end of each said conductor of each said lead is secured to a cylindrical conductive part.

4. A connection according to claim 3, wherein said cylindrical conductive part is of copper.

5. A connection according to claim 1 wherein each said conductor of said current leads is individually placed within an electrically insulating tube.

6. A connection according to claim 5, wherein circulation of cryogenic fluid vapor ensures that each said conductor of said current leads is cooled inside said insulating tube.

7. A connection according to claim 1, wherein said conductors of each said lead are placed within the double wall of an electrically insulating tube, the two tubes being disposed coaxially.

8. A connection according to claim 7, wherein circulation of the cryogenic fluid vapor ensures cooling of said conductors of said current leads inside the double wall of each said insulating tube.

9. A connection according to claim 1, wherein said conductors of said current leads are of the assembled type comprising a plurality of strands constituted by copper filaments in a cupro-nickel matrix.

10. A connection according to claim 6, wherein said conductors are of the hybrid type comprising, in their low temperature portion, a superconductive element of high critical temperature.

11. An application of the connection according to claim 1 to an apparatus comprising a superconductive coil placed in a cryostat, said cryostat having an external wall and a metal internal wall, said walls being separated by a vacuum, said metal internal wall being maintained at a high voltage.

12. An application according to claim 11, wherein said external wall is constituted by an electrically insulating material.

13. An application according to claim 12, wherein said external wall of the cryostat bears ribs of an insulating material.

14. An application according to claim 11, wherein said external wall of said the cryostat is made of metal.

15. An application according to claim 14, wherein said walls of said cryostat are also insulated from each other by an insulating part comprising anti-coronas.

16. An application according to claim 15, wherein said insulating part also comprises ribs of an isolating material.

17. An application according to claim 11, wherein a solid electrical insulator is included between the conductors in the hot zone of said cryostat.

* * * * *